United States Patent [19]
Smith et al.

[11] Patent Number: 5,993,906
[45] Date of Patent: Nov. 30, 1999

[54] EDGE SEAL PROCESS AND PRODUCT

[75] Inventors: Robert W. Smith, Converse, Ind.;
David S. Cobbledick, Kent, Ohio;
Charles M. Kausch, Akron, Ohio;
Donald F. Reichenbach, Massillon,
Ohio; Satish C. Sharma, Stow, Ohio;
Richard Simmons, Akron, Ohio

[73] Assignee: Cambridge Industries, Inc., Madison Heights, Mich.

[21] Appl. No.: 08/081,744

[22] Filed: Jun. 23, 1993

[51] Int. Cl.$^6$ .................................. B05D 3/02; B05D 7/02
[52] U.S. Cl. ........................... 427/316; 427/290; 427/386
[58] Field of Search .................................... 427/316, 386, 427/140, 290

[56] References Cited

U.S. PATENT DOCUMENTS

| | | |
|---|---|---|
| 2,690,592 | 10/1954 | Schanz . |
| 3,002,849 | 10/1961 | Harmon et al. . |
| 3,026,566 | 3/1962 | Martelli et al. . |
| 3,147,144 | 9/1964 | Wilhelm . |
| 3,523,031 | 8/1970 | Walters . |
| 3,538,043 | 11/1970 | Herold et al. . |
| 3,613,159 | 10/1971 | Bieglep . |
| 3,671,300 | 6/1972 | Kawakita et al. ....................... 427/386 |
| 3,720,540 | 3/1973 | Wimmer . |
| 3,723,153 | 3/1973 | Suita et al. . |
| 3,728,776 | 4/1973 | Defazio .................................. 427/386 |
| 3,742,106 | 6/1973 | Price . |
| 3,814,645 | 6/1974 | Fletcher et al. . |
| 4,024,304 | 5/1977 | Smock et al. ........................... 427/316 |
| 4,081,578 | 3/1978 | van Essen et al. . |
| 4,093,674 | 6/1978 | Tsutsui et al. . |
| 4,235,952 | 11/1980 | Holmes et al. ......................... 427/140 |
| 4,239,808 | 12/1980 | Arnason .................................. 428/482 |
| 4,331,735 | 5/1982 | Shanoski . |
| 4,374,238 | 2/1983 | Shanoski . |
| 4,409,270 | 10/1983 | Faber et al. ............................... 428/63 |
| 4,414,173 | 11/1983 | Cobbledick et al. . |
| 4,508,785 | 4/1985 | Cobbledick et al. . |
| 4,559,164 | 12/1985 | Kostelnik et al. ....................... 252/511 |
| 4,567,106 | 1/1986 | Sano et al. .............................. 428/413 |
| 4,603,074 | 7/1986 | Pate et al. . |
| 4,608,404 | 8/1986 | Gardner et al. ......................... 523/400 |
| 4,659,532 | 4/1987 | Renger . |
| 4,861,832 | 8/1989 | Walsh . |
| 4,999,221 | 3/1991 | Eigenbrod et al. . |
| 5,021,297 | 6/1991 | Rhue et al. . |
| 5,084,353 | 1/1992 | Cobbledick et al. . |
| 5,139,821 | 8/1992 | Suzuki . |
| 5,178,657 | 1/1993 | Gicquel .................................. 427/386 |
| 5,654,037 | 8/1997 | Moore et al. ........................... 427/379 |
| 5,674,565 | 10/1997 | Kausch et al. ......................... 427/258 |

FOREIGN PATENT DOCUMENTS

| | | |
|---|---|---|
| 0 299 420 | 1/1989 | European Pat. Off. . |
| 2 042 930 | 10/1980 | United Kingdom . |

OTHER PUBLICATIONS

Derwent Abstract #48807 of Japanese Patent J63182078A, Jul., 1988.
Derwent Abstract #48912 of German Patent DE3916948A1, Dec. 1989.

*Primary Examiner*—Diana Dudash
*Attorney, Agent, or Firm*—Reising, Ethington, Barnes, Kisselle, Learman & McCulloch

[57] ABSTRACT

A liquid thermoset coating is described for application on and near surfaces of molded plastic parts where the resin rich phase has been disturbed or imperfectly formed. The coating has been found to be effective at minimizing paint pops and craters in subsequent finish coatings on said parts. Said paint pops and craters develop during heated cure cycles for the finish coatings. The coating which is applied to the heated part and subsequently cured is preferably an epoxy composition of low viscosity. The molded plastic parts are preferably fiber reinforced thermoset polyester parts with an in-mold coating to improve surface quality.

10 Claims, 1 Drawing Sheet

EDGE SEAL PROCESS AND PRODUCT

FIELD OF INVENTION

The present invention relates to a method of reducing surface defects known as paint pops or paint craters by coating a plastic substrate surface, and more particularly coating a fiber-reinforced thermoset plastic substrate surface with a liquid thermoset coating composition to provide a barrier to gases generated from the plastic during the baking of subsequently applied surface coatings.

A preferred liquid thermoset coating is a liquid epoxy resin composition. These coatings are applied to surfaces of the molded parts. The invention is particularly applicable where the resin rich skin of the part has been disturbed or was not completely formed. It is also desirable to apply the coating to a warm or hot part as this lowers the viscosity of the epoxy resin, allowing the epoxy to better penetrate the surface of the plastic part.

BACKGROUND

Molded thermoset plastics are finding increased utilization as substitutes for metals in a variety of areas such as automotive parts, recreational vehicles, etc. Many of these applications are for painted parts requiring smooth surface appearance and these parts often have in-mold coatings to achieve the smoothness. These molded thermosets also use low profile additives to decrease part shrinkage during molding. The low profile additive and molding conditions can create internal porosity that can entrap air, gases, and volatile compounds. Any abrasion, cutting, or fracture of the molded parts creates disruptions of a resin rich skin on said molded part, said disruptions having enhanced surface porosity. It is known that during heated cure cycles for subsequent finish paints (coatings) on fiber reinforced thermoset parts, blemishes in the top coating, known as paint pops or craters, can develop. It is believed that gases evolving from internal porosity are creating these defects as the gases try to escape from the molded part during the heated cure cycle for the coating.

U.S. Pat. No. 5,021,297 describes heating a molded plastic part (degassing the part) and then applying a thermoset powder coating over the surfaces of the part that will be subsequently coated. To be effective this barrier needs to be substantial, 1–6 mils thick.

SUMMARY OF THE INVENTION

In accordance with the present invention, a method of sealing any porous surfaces created by abrasion, cutting, or fracture of a molded plastic substrate is provided. For the purpose of simplicity, these surfaces created subsequent to molding will be referred to as machined surfaces to distinguish them from molded surfaces. The invention is also applicable to resin rich molded surfaces which are discontinuous or incompletely formed. The method comprises preheating the substrate to a temperature above 120° F. (49° C.) and below the decomposition temperature of the substrate; applying a liquid epoxy composition comprising one or more epoxy oligomers, a hardener for the epoxy oligomers, and optionally graphite and carbon black to said machined surfaces; and curing said coating composition. Optionally any excess coating composition can be removed by processes such as wiping the surface with a cloth prior to curing said coating composition. The removal of excess coating material may help force the coating material into cracks and pores, providing a better seal, and serves to level the surface of the part minimizing subsequent sanding operations.

BRIEF DESCRIPTION OF DRAWINGS

FIG. 1 is a part having a shear edge with flashing (B) which would be trimmed off by cutting or grinding. FIG. 2 shows a thermoset part wherein the edge (C) has been cut to a particular angle. FIG. 3 shows a thermoset part wherein the edge (D) was ground perpendicular to the other surfaces FIGS. 1 and 2 show an in-mold coating (A) on said parts.

DETAILED DESCRIPTION OF THE INVENTION

Figure 1:
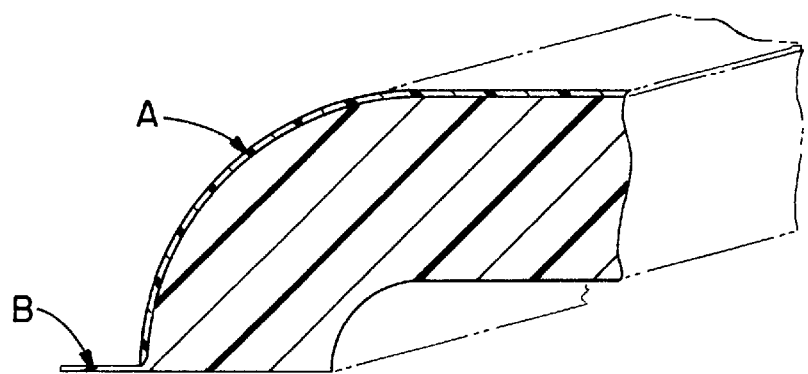
FIGS. 1, 2, and 3 show three different edges that may be created on molded plastic parts.
Figure 2:
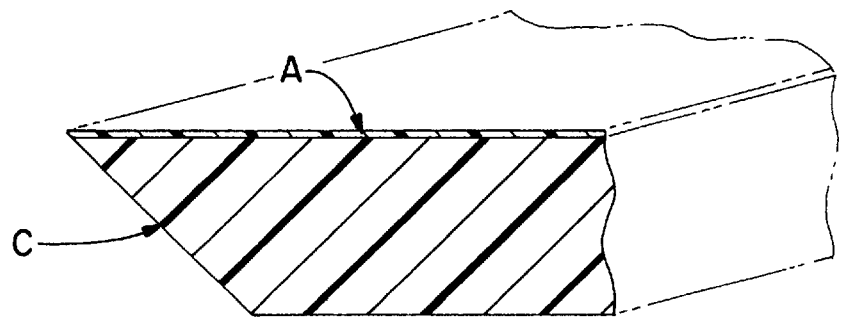
Figure 3:
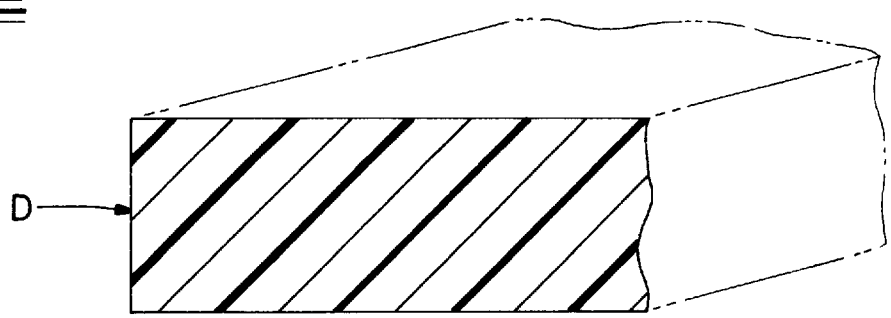

Liquid thermoset coatings are described which are applied to any uncoated surface of the part and preferably to machined surfaces of molded plastic parts. These coatings were found to minimize the number of surface defects that occurred in subsequent surface coatings e.g., paint on the same part during oven curing cycles for the subsequently applied coatings. The defects to be minimized are known as paint pops or craters in the cured coating. They are believed to be caused by gases trapped below the coating traversing into and through the coating during curing. The liquid thermoset coatings of this invention are thought to provide a barrier to the gases from the molded part that potentially cause paint pops and craters.

Fiber-reinforced thermoset molded parts generally have internal porosity. Low profile additives in automotive type body panels may increase the tendency to create internal porosity while minimizing the shrinkage of the part's exterior dimensions. Most molded thermoset parts have a resin rich layer on the surface which was in contact with the mold surface. This resin rich layer can partially block passage of gases from the internal porosity to the surface. Any process which disrupts this resin rich layer can increase the surface porosity of the parts. The name disrupted or machined surfaces will refer to any surface which has been altered by any processes such as cutting, abrasion, or fracture. These processes include die-cutting, deflashing, routing, sanding, punching out holes, and drilling. Solvent treatment and handling of the part during manufacturing and transporting can also cause disruption of the resin rich layer. They can be distinguished easily from molded surfaces. The term machined as used herein does not specifically require that a machine be used to create the surface.

Surface defects in subsequent coatings caused by the escape of trapped gases are more prevalent on or near machined surfaces than more removed areas of the part. As these machined surfaces are created after in-mold coating has occurred, these surfaces are not in-mold coated. The pores of the porous plastic can be from a size large enough to be visible to submicron sizes. The pores are believed to supply gases during heated cure cycles that can pass through partially cured coatings creating either holes, craters or paint pops. It is preferred to apply these coatings only to machined surfaces (surfaces created subsequent to molding) and/or surfaces where the resin rich layer has been disrupted, as the internal porosity of the parts is most open to the surface at these points. Experience has shown that surfaces adjacent to the machined surfaces (for some unknown reason) exhibit an increased tendency to generate surface defects. Accordingly it is expeditious to also cover the adjacent surfaces with the liquid thermoset coating. The coating may also be applied to surfaces other than disrupted surfaces where surface defects are a problem.

The preferred porous plastic parts useful as substrates for the coating are thermosets, with fiber reinforced thermosets being highly preferred. Examples of thermoset plastics are unsaturated polyester resins, epoxy resins, acrylic terminated epoxy resins (also known as vinyl ester resins), phenolics, and melamine formaldehydes. Unsaturated polyesters and vinyl ester resins are preferred. A preferred substrate is a fiber reinforced thermoset part having from about 10 to about 75 wt % glass fibers and preferably from about 25 to 35 wt % glass fibers. It is also preferred that these molded parts have in-mold coatings on one or more surfaces of said parts. In-mold coatings are well known to the art. U.S. Pat. No. 5,084,353, is hereby fully incorporated by reference and discloses a preferred in-mold coating.

Various fibers and methods of fiber reinforcement are available to reinforce plastic parts. Fibers can be fiberglass (solid or hollow), nylon, carbon, aramid, etc. The fibers can be present as chopped, nonwoven webs, woven webs, bundles, strands, etc. The preferred fibers are chopped fiberglass bundles of from about 0.5 to about 1.5 inches (1.3 to 3.8 cm) in length. Fiber reinforced plastic parts can be made from compounds called sheet molding compound (SMC), bulk molding compound (BMC), thick molding compound (TMC), or by processes involving prepregs, wet layup, wet wind systems, and filament winding. Any of these compounds or processes would be suitable to form the fiber reinforced plastic substrate parts of this invention.

The porous plastic can include various additives such as low profile compounds, mold release agents, viscosity modifiers, and mineral fillers such as calcium carbonate, dolomite, clays, talcs, zinc borate, perlite, vermiculite, hollow or solid glass or polymeric microspheres, hydrated alumina, and the like.

The liquid thermoset coating is desirably a liquid at room temperature and desirably has a Brookfield viscosity at 25° C. of about 4000 poise or less and preferably about 2000 or 1000 poise or less such that it can be easily applied to the disrupted surfaces as a liquid. Coating compositions with high concentrations of conductive pigments were found to be pastelike at Brookfield viscosities of 700 poise at 10 rpm and 100° F. Therefore, conductive edge sealer compositions desirably have viscosities of 500 poise or less and more desirably of 300 poise or less so they can easily wet and adhere to the surfaces of a molded part. The coating can be applied with any known method such as brush, roller, sponge, spatula, an air or airless sprayer or other conventional coating applicator. After a uniform coating is applied to the desired area of the plastic substrate, any excess coating material may be removed. Preferred methods of removal include wiping with a cloth, sponge, squeegee, or equivalent. Thus, the coating can be made or reduced to 5 mils or less, preferably from about 0.5 to about 3 mils thick, and most preferably 1 mil or less thick.

Preferred liquid thermoset coatings are epoxy resins cured with polyamide curing agents. Preferred epoxy resins are those derived from the reaction product of bisphenol A with epichlorohydrin. Thus, a preferred epoxy resin is the diglycidyl ether of bisphenol A as shown below:

where n is an integer from 0 to 5 and is preferably 0. An important criteria in selecting an epoxy resin is the viscosity. Desirably they have an epoxy equivalent weight from about 156 to 350. Lower molecular weight resins have lower viscosities. Other epoxy resins include polyglycidyl ethers of polyphenols such as those made from alkyl or halogen substituted bisphenol A, epoxies from bisphenol F, phenol formaldehyde resins reacted with epichlorohydrin (novolak epoxies), tetraphenylolethane epoxy; dicycloaliphatic epoxy resins made by the epoxidation of cycloolefins with peracids; aromatic glycidyl amine resins; polyglycidyl esters formed from aliphatic, cycloaliphatic, or aromatic polycarboxylic acids which are reacted with epichlorohydrin and then dehydrohalogenated; polyglycidyl ethers of polyhydric polyols; and cycloaliphatic epoxy resins. These desirably have 2 or more reactive 1,2-epoxy groups per molecule or oligomer. The term epoxy resins includes blends of the above epoxy resins. It is anticipated that one would blend epoxy oligomers to help control the viscosity of the final epoxy composition.

Epoxy diluents may be included in the epoxy composition either in the epoxy resin as purchased or purposefully added to lower the viscosity of the epoxy composition. Epoxy diluents as defined here are similar to the above-type chemical compounds, useful to make epoxy resins having 1,2-epoxy groups, but are modified or reacted in such a manner to produce an average of from about 1 to less than 2 1,2-epoxy groups per molecule. These are preferred to non-reactive diluents in that they are capable of being chemically bound into the epoxy network and thus are not easily volatilized. Another desirable characteristic of the epoxy diluents is that they have a lower viscosity than the above epoxy resins. Desirably these viscosities are less than 15 poise, desirably less than 10 poise, or and preferably less than 5 poise, as measured by a Brookfield viscometer at 100° F.

The hardener composition can consist of curing agents that react with the epoxy to form a crosslinked network or a catalyst that increases the speed of the epoxy polymerization reaction or allows the reaction to occur at a lower temperature. The catalysts include tertiary amines and Lewis acids. The catalysts may be present up to about 10 parts by weight per 100 parts by weight of said thermoset coating and is desirably present from about 0.5 to 8 parts by weight. The curing agents may be present in small or large amounts depending on their equivalent weight. Desirably, the equivalent ratio of reaction sites on the curing agent to epoxy groups is from about 0.3 to 3, and preferably from about 0.4 to 1.

The curing agent may be a amidopolyamine such as a fatty acid polyethyleneamine based polyamide; a polyamine such as diethylene triamine, triethylene tetramine or higher homologues; a latent curing system such as a mixture of Ancamine™ 2014 FG and dicyandiamide; or cyclic acid anhydrides such as phthalic anhydride, hexahydrophthalic anhydride, maleic anhydride, itaconic anhydride, acetylcitric anhydride, aconitic anhydride and trimellitic anhydride. Other curing agents that may be employed include

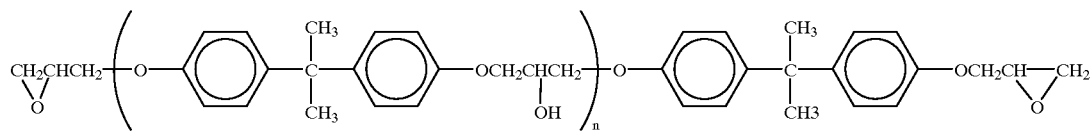

substituted imidazoles (e.g., 2-ethyl-4-methylimidazole), hydrazides (e.g., carbohydrazide), aminothiols, polythioureas and phenols, including phenol-formaldehyde novolac resins. Catalysts can include a Lewis base such as benzyldimethylamine, benzyldiethylamine, triethylamine, pyridine, tripropylamine, tributylamine, 2-picoline, and 4-picoline. Lewis acids such as boron trifluoride or aluminum chloride can also be used.

The liquid thermoset coating may contain a variety of additives to enhance certain aspects of its performance. Conductive pigments such as graphite and carbon black can be added to make the coating conductive. Desirably, these two pigments are used in combination. The graphite can desirably be present up to about 150, more desirably from about 5 to about 120, and preferably from about 20 to about 75 parts per 100 parts of said epoxy composition. The carbon black is desirably present up to about 25, more desirably from 0.5 to about 15, and preferably from about 1 to about 10 parts by weight per 100 parts of said epoxy composition. Lower viscosity epoxy resins or epoxy diluents may be used to minimize viscosity increases associated with the use of these conductive pigments.

Other possible additives are pigments, fillers, adhesion promoters, and protectorants, such as UV absorbers, from environmental factors. Desirably, the amount of non-reactive (inert) diluents (solvents) are minimized. The term non-reactive is used here to mean that these molecules do not chemically react into a thermoset polymer network with the other molecules during the curing reaction of the liquid thermoset coating. Thus, they are free to evaporate before, during, or after the curing reaction. The amount of these diluents is desirably limited to less than 30, more desirably less than 10, and preferably not present above 5 parts by weight per 100 parts by weight of the liquid thermoset coating. Most preferably, the liquid thermoset coating is substantially free of non-reactive diluents.

It is desirable to preheat the substrate to a temperature from about 120° F. (49° C.) to about 400° F. (204° C.), more desirably from about 170° F. (77° C.) or 200° F. (93° C.) to about 350° F. (177° C.), and preferably from about 250° F. (121° C.) to about 300° F. (149° C.) before applying the coating. This may serve to minimize the amount of volatiles or gases in the porous part before coating. It also thins the coating material and lowers the surface energy of the epoxy resin allowing it to better penetrate the surface of the part. Then the coating is cured at an appropriate temperature. Desirably, the coating is cured within a few minutes or hours after being applied. The curing temperature depends on the curing mechanism. For epoxy resins, the curing temperature is desirably from about 25° C. to about 200° C., preferably from about 40° C. to about 175° C., and most preferably from about 100° C. to about 160° C.

The machined surfaces of the plastic part are coated with the liquid thermoset coating and cured. Then the part may be coated with one or more coatings (paint) and said one or more coatings cured individually or jointly at elevated temperatures such as from 200° F. (93° C.) to 400° F. (204° C.). The coatings will have a decreased propensity to have coating defects in the form of holes, craters, or paint pops in or near the machined areas sealed when the edge sealant is present.

The liquid thermoset coating and the substrate with this cured coating have particularly effective utility as an edge seal on machined in-mold coated thermoset BMC, SMC, and TMC parts. The edge seal has utility on surfaces where the in-mold coating was not applied or where it was abraded away, ruptured, or removed. As previously mentioned, the coating may be utilized on surfaces where the resin rich layer is discontinuous or incompletely formed. Common causes of discontinuities are air entrainment, insufficient dispersion of fillers or fibers, microcracks from localized failure and non-compacted resin areas. Names for the discontinuities include pits, pores, cracks, and crevices. The uses for these parts include automobile body panels, parts on recreation vehicles, and housings for electronics. The liquid thermoset coating can also function as a sealant for a variety of parts made from oriented fibers by processes where prepregs, wet resin layup, wet wind systems, and filament winding are used. These parts can also serve as structural components.

In these applications, the thermoset molded parts with their machined areas sealed can be subsequently coated and thermally cured with fewer rejects and less need for reworking of defective paint finishes.

EXAMPLES

An SMC paste was prepared by mixing an unsaturated polyester resin as shown in Table I below. The low profile additive was poly(vinyl acetate), the inhibitor was hydroquinone, the catalyst was t-butyl perbenzoate, and the mold release was zinc stearate. The unsaturated polyester was a poly(propylene fumarate) copolymer having an average molecular weight of between 1000 and 1600 with trace amounts of diols other than propylene diol.

TABLE I

| Paste | |
|---|---|
| Unsaturated Polyester | 13.8%, by weight |
| Low Profile Additive | 9.2% |
| Styrene | 3.7 |
| Inhibitor | 0.005% |
| Peroxide Catalyst | 0.25% |
| Viscosity Reducer | 0.8% |
| Mold Release | 1.0% |
| Calcium Carbonate | 69.8% |
| MgO | 1.4% |
| TOTAL: | 100. |

Fiber Glass: 1 inch long chopped strand fiberglass.
Final SMC Composition: 20 parts by wt. fiberglass based on 80 parts by wt. paste.

The SMC was compression molded in a 16"×16" mold for 90 seconds at 300° F. (149° C.) using centrally placed square charges of SMC that covered either 47% (10×10") or 66% (13×13") of the mold surface and gave 0.1" thick moldings. The higher mold coverage charge gave molded panels with more internal porosity and subsequently a greater tendency to have paint pops. The top surface of the panels and all four sides were first sanded with a 220 grit sandpaper and then a 320 grit sandpaper to open this internal porosity to the surface. The panels were then heated for ½ hour at 320° F. (160° C.). Liquid thermoset coatings 1, 2, and 4–11 of Table II were applied to the hot parts while coatings 3, 12, and 13 were applied to cold parts. The various compositions were applied to ½ the top surface of the panels and to ½ of the edges. The other half of each panel was not coated and was used as an uncoated control. Each coating was tried on 6 panels. The coatings were allowed to briefly soak and then the excess was removed by wiping with a clean cellulosic cloth. The coating and panel were then put in a 320° F. (149° C.) oven for ½ hour. The panels were then alternately painted with one of two paint systems.

The A coating system was primer from Seibert Oxidermo (high solids conductive primer) having code #BP9471 which was baked 30 minutes at 300° F. and 30 minutes at 400° F. Then a BASF primer code #U280RK035 was applied and baked for 30 minutes at 300° F. Then a PPG White enamel code #ESBM33T100 was applied and baked for 30 minutes at 275° F. These coatings were applied to all surfaces of the part (both sealed and unsealed).

The B coating system was a PPG code #RPP9860 light gray primer (a polyester melamine type coating) which was baked on for 20 minutes at 250° F. Then a DuPont white topcoat code #872-DF167 (a polyester-acrylic-melamine coating) was applied and allowed to flash for 5 minutes over which was applied a DuPont code #RK-7103 clear coat (an acrylic melamine coating). The application of the clear coat was a wet on wet coating type. The clear coat was allowed to flash for 10 minutes before baking. Then the last two coatings were simultaneously baked for 30 minutes at 250° F.

Three panels with the A coating and three with the B coating were examined. The number of holes and craters were then counted on the sealed and unsealed flat portions of the panels. The results are shown in Table II. A hole is a circular depression in the paint with a raised rim around its periphery. It is about 1 mm across, and has a small hole at its center that leads to the substrate through the paint layers. A "crater" is a smooth irregular shaped hole in the paint ranging in size from 0.1 mm to 1 or 2 mm. Most are caused by shallow pits in the substrate.

TABLE II

| Coating Composition | Finish Paint | Unsealed | | | Sealed | | |
|---|---|---|---|---|---|---|---|
| | | Craters | Holes | Total | Craters | Holes | Total |
| 1. Epon 815[1] + V-40[2] + Graphite + Carbon 75:25:32:1.6 by wt. | A | 2 | 3 | 5 | 2 | 10 | 12 |
| | B | 18 | 18 | 36 | 0 | 5 | 5 |
| 2. Epon 828[3] + V-40 + Graphite + Carbon + Epoxy Diluent 65:25:32:1.6:10 | A | 11 | 12 | 23 | 0 | 1 | 1 |
| | B | 28 | 9 | 37 | 3 | 1 | 4 |
| 3. Derakane 786[4] + Styrene + 1 wt. % TBP 70:30:1 by wt. | A | 3 | 18 | 21 | 0 | 21 | 21 |
| | B | 7 | 6 | 13 | 5 | 11 | 16 |
| 4. Epon 828 + V-40 3:1 by wt. | A | 16 | 18 | 34 | 0 | 5 | 5 |
| | B | 11 | 30 | 41 | 1 | 19 | 20 |
| 5. Epon 828 + V-40 + Xylene 3:1:1 by wt. | A | 2 | 13 | 15 | 0 | 3 | 3 |
| | B | 20 | 25 | 45 | 3 | 3 | 6 |
| 6. Epon 828 + Dyhard[5] + Ancamine 2014[6] 100:5:6 | A | 5 | 7 | 12 | 0 | 2 | 2 |
| | B | 7 | 16 | 23 | 5 | 1 | 6 |
| 7. Gluvit[7] + Hardener 7.5:1 by wt. | A | 3 | 7 | 10 | 1 | 4 | 5 |
| | B | 16 | 13 | 29 | 1 | 3 | 4 |
| 8. Epon 825 + V-40 V-50[2] 4:3 by wt. | A | 0 | 0 | 0 | 0 | 5 | 5 |
| | B | 16 | 2 | 18 | 0 | 2 | 2 |
| 9. Epon 830[8] + V-25[9] 10:9 by wt. | A | 9 | 12 | 21 | 0 | 0 | 0 |
| | B | 4 | 6 | 10 | 0 | 0 | 0 |
| 10. Epon 828 + V-40 + di butyl phthalate 3:1:1 | A | 2 | 5 | 7 | 0 | 8 | 8 |
| | B | 6 | 10 | 16 | 0 | 5 | 5 |
| 11. Derakane 684-EK[10]40 + Toluene 1:1 by wt. | A | 2 | 11 | 13 | 2 | 10 | 12 |
| | B | 23 | 8 | 31 | 60 | 7 | 67 |
| 12. Shellac based primer Sealer | A | 1 | 19 | 20 | 0 | 16 | 16 |
| | B | 24 | 18 | 42 | 16 | 12 | 28 |
| 13. Ed-Tech[11] + hardener 50:1 by wt. + styrene | A | 3 | 6 | 9 | 2 | 15 | 17 |
| | B | 12 | 13 | 25 | 19 | 3 | 22 |

[1]Epon 815 is liquid epoxy resin similar to Epon 828 with a reactive diluent.
[2]V-40 and V-50 are polyamide curing agents.
[3]Epon 828 is bisphenol A based epoxy resin.
[4]Derakane 786 is vinyl ester resin.
[5]Dyhard is hardener for epoxy resin.
[6]Ancamine 2014 is a hardener for epoxy resins.
[7]Gluvit is a commercial epoxy marine repair kit available from Travaco Labs, Inc.
[8]Epon 830 is liquid epoxy resin.
[9]V-25 is polyamide from Miller-Stephenson
[10]Derakane 684-EK40 is a Dow one-component epoxy product.
[11]Ed-Tech is an unsaturated polyester.
TBP is tertiary butyl perbenzoate The above data show that the Derakane resins (unsaturated polyester resins) are not as effective as the epoxy resin. The epoxy resins were generally effective. The Ed-Tech material, which is a commercial polyester patching compound, was also not effective. The shellac was also found to be less effective at preventing paint pops. Coating 10 used a less volatile diluent while coating 11 used a volatile diluent.

In later experiments the epoxy compositions were diluted with solvents to adjust their viscosity. These diluted compositions were not as effective at minimizing paint defects as were the undiluted compositions applied to hot substrates, but they still show improvement in reducing some types of defects such as crater reductions with composition 10.

In that many plastic parts have a conductive in-mold coating and are subsequently coated electrostatically, it was desirable that the edge seal be conductive. The following formulations in Table III show that when a conductive carbon black pigment (Vulcan XC-72R from Cabot Corp.), was added to a coating composition, it did not give good adhesion. Unexpectedly, the addition of graphite (traditionally thought of as a lubricant not an adhesive agent) increased the adhesion of coating to the substrate. The use of graphite alone (when used at 32 g/100 g of total epoxy resins) did not show sufficient conductivity. The combination of graphite and carbon black gave a conductive coating with good adhesion. The substrate was a 16"×16" fiberglass panel similar to the SMC composition in Table I, and cured for about 90 seconds at 300° F. (149° C.). The coating material was applied as a 2 or 3 mil thick coating to one side of the panels with a spatula and cured for 20 minutes at 300° F. (149° C.) before being evaluated.

TABLE III

| | Formulation | | |
|---|---|---|---|
| | A | B | C |
| Part A | | | |
| Epon 828 Resin | 65.0 g | 65.0 | 65.0 |
| Cardolite NC-513[1] | 10.0 | 10.0 | 10.0 |
| #508 Graphite Powder[2] | — | 24.0 | 24.0 |
| Vulcan XC-72R[3] | 2.5 | — | 1.2 |
| Part B | | | |
| Epon Hardener V-40 | 25.0 | 25.0 | 25.0 |
| #508 Graphite Powder | — | 8.0 | 8.0 |
| Vulcan ™ XC-72R | 0.5 | 0.4 | 0.4 |
| Conductivity (Ransberg Meter Reading)[4] | 135 | 0 | 135 |
| Adhesion (scalpel, a severe test) | Poor | Good | Good |

[1]Cardolite NC-513 is

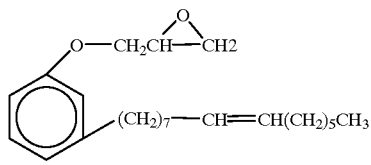

available from Cardolite Corp, in Newark, New Jersey (USA).
[2]#508 Graphite powder was supplied by Ashbury Graphite Mills is 85 wt. % or more carbon and passes through a 325 mesh screen.
[3]Vulcan ™ XC-72R is a high structure carbon black available from Cabot Corp.
[4]Conductivity was tested with a Ransberg meter available from Ransberg Electro-Coating Corporation. Values above 120 are suitable for electrostatic painting.

In the above examples of Table III, a reactive epoxy diluent, Cardolite NC-513 was used to reduce the viscosity of the epoxy composition. Table IV shows the reduced viscosity of recipes I and II over the control which lacks low viscosity epoxy reactants. All parts in Table IV are by weight.

TABLE IV

| COMPONENT A | | | |
|---|---|---|---|
| INGREDIENTS | CONTROL | I | II |
| Epon 828 | 75.0 | 75.0 | 75.0 |
| #508 Graphite | 24.0 | 24.0 | 24.0 |
| Vulcan XC-72R | 1.2 | 1.2 | 1.2 |
| Tetraethylammonium Tosylate | 0.5 | 0.5 | 0.5 |
| Cardolite NC-513 | — | 10.0 | — |
| Union Carbide UVR-6110[1] | — | — | 10.0 |
| BROOKFIELD VISCOSITY, cps | | | |

TABLE IV-continued

| (Model DV II, Spindle D) 10 rpm | 70,400 | 24,000 | 49,600 |
|---|---|---|---|
| (100° F.) 100 rpm | 47,500 | 13,600 | 29,400 |

| COMPONENT B | |
|---|---|
| INGREDIENTS | I |
| V-40 Hardener | 25.0 |
| #508 | 8.0 |
| Vulcan XC-72R | 0.4 |

| FINAL COATINGS (3:1 A:B BY WT.) | | | |
|---|---|---|---|
| COATING | CONTROL | I | II |
| Brookfield Viscosity, cps | | | |
| (Model DV II, Spindle D) 10 rpm | Not Measured | 8,000 | 17,600 |
| (100° F.) 100 rpm | Not Measured | 4,800 | 7,040 |

Coatings I and II were applied to sanded SMC panels, and cured at 300° F. for 10 and 20 minutes, as noted. The coating properties were as follows:

| COATING (CURE TIME) | PENCIL HARDNESS | GRAVELOMETER[2] | CROSSHATCH[3] | CONDUCTIVITY |
|---|---|---|---|---|
| I (10 min) | H/HB | 9 | 1 | 130 |
| I (20 Min.) | H/HB | 8 | 0 | 136 |
| II (10 min.) | H/HB | 8 | 0 | 135 |
| II (20 min.) | H/HB | 7 | 0 | 136 |

[1]Union Carbide UVR-6110 is

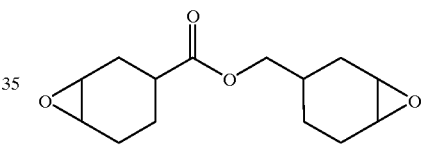

which has a viscosity of 350–450 cp by Brookfield viscometer at 25° C.
[2]Gravelometer test is SAE J-400 and more specifically GM 9508P.
[3]Crosshatch Tape Adhesion is Ford Laboratory Test (FLTM) BI 6-1.

While in accordance with the Patent Statutes, the best mode and preferred embodiment has been set forth, the scope of the invention is not limited thereto, but rather by the scope of the attached claims.

What is claimed is:

1. A process for decreasing defects on a molded fiber reinforced thermoset plastic part which part is, subsequent to being subjected to said process, surface coated and subjected to an elevated temperature said defects being caused by emanating subsurface gases, said process comprising:

first heating said molded thermoset fiber reinforced plastic part, said part having one or more machined surfaces formed by cutting or abrading, to a temperature of from about 120° F. (49° C.) to 400° F. (204° C.), then applying a coating of a liquid epoxy composition to one or more machined surfaces of said part, wherein said liquid epoxy composition has a Brookfield viscosity at 25° C. of less than 4,000 poise, and thereafter allowing said liquid epoxy composition to cure into a thermoset coating, wherein said liquid epoxy composition comprises at least one oligomer having two or more reactive epoxy end groups and a hardener component reactive with said epoxy end groups, and wherein said defects are paint pops and paint craters in subsequently applied surface coatings.

2. A process according to claim 1, wherein said heating step is to a temperature of at least 77° C. and wherein said oligomer includes diglycidyl ethers of bisphenol A, wherein said liquid epoxy composition has less than 10 weight percent nonreactive diluents which are capable of evaporating before, during, or after curing of said liquid epoxy composition, and wherein said fiber reinforced plastic part is a thermoset vinyl ester or unsaturated polyester resin having from 10 to 75 weight percent fibers.

3. A process according to claim 2, wherein said liquid epoxy composition includes sufficient conductive pigments such that the cured epoxy composition is electrically conductive.

4. A process according to claim 3, wherein said liquid epoxy composition includes one or more reactive epoxy diluents which have an average of from 1 to less than 2 reactive epoxy groups per molecule.

5. A process according to claim 2, wherein said heating step is to a temperature of at least 93° C. and said oligomers include at least 50 wt. % of the epoxy oligomers which are diglycidyl ethers of bisphenol A having average epoxy equivalent weights of from about 156 to about 350.

6. A process according to claim 2, wherein said hardener component comprises a curative component which is a polyamide.

7. A process according to claim 6, wherein said polyamide is a amidopolyamine.

8. A process according to claim 6, wherein said liquid epoxy composition is cured at a temperature from about 93° C. to about 204° C., and wherein said fiber reinforced thermoset plastic part was made from sheet molding compound.

9. A process according to claim 2, wherein the hardener component includes a polyamine or an anhydride.

10. A process according to claim 2, wherein said liquid epoxy composition is also applied to surfaces of the part having a discontinuous resin rich surface layer.

* * * * *